United States Patent [19]

McCarthy et al.

[11] 4,146,001

[45] Mar. 27, 1979

[54] ANGULAR POSITION TRANSDUCERS FOR USE IN ENGINE TIMING CONTROLS

[75] Inventors: Paul M. McCarthy, Tamworth; Duncan B. Hodgson, Leamington Spa; Andrew P. Ives, Knowle; John H. Moore, Redditch, all of England

[73] Assignee: The Lucas Electrical Company Limited, Birmingham, England

[21] Appl. No.: 870,988

[22] Filed: Jan. 20, 1978

Related U.S. Application Data

[63] Continuation of Ser. No. 578,660, May 19, 1975, abandoned.

[30] Foreign Application Priority Data

Aug. 20, 1974 [GB] United Kingdom ............... 36548/74
Oct. 8, 1974 [GB] United Kingdom ............... 43481/74
Oct. 8, 1974 [GB] United Kingdom ............... 43482/74

[51] Int. Cl.$^2$ .............................................. F02P 5/04
[52] U.S. Cl. ............................. 123/117 R; 123/148 E; 310/70 A; 310/152; 310/111

[58] Field of Search ............ 123/148 E, 117 R; 310/70 R, 70 A, 152, 156, 111

[56] References Cited

U.S. PATENT DOCUMENTS

| | | | |
|---|---|---|---|
| 3,719,177 | 3/1973 | Oishi | 123/148 E |
| 3,867,916 | 2/1975 | Bigalke | 123/117 R |
| 3,888,220 | 10/1975 | Bigalke | 123/117 R |
| 3,915,131 | 10/1975 | Brungsberg | 123/117 R |

Primary Examiner—Ronald B. Cox
Attorney, Agent, or Firm—Holman & Stern

[57] ABSTRACT

An angular position signal generator includes a rotor and a stator each having an arrangement of salient magnetic poles. The poles on the rotor are all of the same polarity and are spaced at unequal angles around the axis of the rotor. The poles on the stator are identically arranged so that in at least one position of the rotor all the poles are aligned and in at least two other positions only some of the poles are aligned. As the rotor rotates, therefore, the flux flowing between the poles fluctuates and a winding in the flux path produces pulses of different magnitudes at these various positions of the rotor.

18 Claims, 17 Drawing Figures

ANGULAR POSITION TRANSDUCERS FOR USE IN ENGINE TIMING CONTROLS

This is a continuation of application Ser. No. 578,660, now abandoned, filed May 19, 1975.

This invention relates to angular position signal generators for use in engine timing control systems.

In the control of spark ignition timing it is known to use an angular position detector which produces pulses at regular intervals as the engine shaft is rotated. It has been proposed to use such pulses to signal various operations in a sequence of operations to assure that, for each cylinder of the engine there is a datum position defined for the spark generator — the spark being actually produced at an instant corresponding to a given angular movement of the shaft beyond the datum position.

Similarly in a petrol injection system it is required to inject fuel into a particular branch of the engine air intake manifold at a given point in the engine operating cycle.

It is one object of the invention to provide an angular position signal generator for use in an engine timing control system which will permit accurate and unambiguous determination of the arrival of the engine shaft at a datum position in a simple and efficacious manner.

In accordance with the invention an angular position signal generator for use in an engine timing control system comprises a rotor and a stator, the rotor having thereon a set of salient magnetic poles all of the same polarity and arranged circumferentially at unequal angular intervals around the rotor and the stator having a set of salient magnetic poles arranged circumferentially at the same unequal angular intervals so that in at least one position of the rotor each of the poles on the rotor is aligned with a corresponding one of the poles on the stator and in at least two other positions of the rotor a proportion (less than unity) of the poles on the rotor will be aligned with poles on the stator so that when the rotor is rotating relative to the stator there will be a flow of flux between the rotor and the stator in said at least one position and a lesser flow of flux therebetween in each of said at least two other positions, and means for producing an electrical output signal varying in accordance with the flow of flux between the rotor and the stator.

The invention also resides in apparatus for indicating successive positions of a rotating member comprising in combination an electromagnetic generator connected to be driven by the rotary member and producing a train of pulses consisting of primary and secondary pulses, there being at least one secondary pulse between each pair of successive primary pulses and the secondary pulses being of magnitude different from that of the primary pulses, recognition means connected to said generator distinguishing the primary pulses from the secondary pulses and including integrating means for generating a signal corresponding to the time integral of at least part of the voltage wave form of each pulse and control means connected to the recognition means and providing output signals indicating successive positions of the rotating member.

In accordance with a further aspect of the invention there is provided an internal combustion engine spark ignition system comprising an electromagnetic generator connected to be driven by the engine and producing a pulse train consisting of primary and secondary pulses, at least one secondary pulse occurring between each pair of successive primary pulses and the primary pulses being of magnitude different from that of the secondary pulses, recognition means connected to the generator and distinguishing between the primary and secondary pulses, said recognition means including an integrating circuit generating a signal corresponding to the time integral of at least a part of the wave form of each pulse, and ignition control means connected to the recognition means and arranged to generate a spark in the interval between a secondary pulse and the following primary pulse and the following primary pulse delayed from that secondary pulse by a period determined by a signal generated in said control means in the interval between the preceding primary pulse and a secondary pulse.

In accordance with yet another aspect of the invention there is provided an internal combustion engine fuel injection system comprising at least one first injector, at least one second injector, said injectors being operable in timed relationship with the operation of the engine, an electromagnetic generator driven by the engine and producing a pulse train consisting of primary and secondary pulses, there being at least one secondary pulse between each pair of successive primary pulses and the primary pulses being of magnitude different from that of the secondary pulses, and said primary and secondary pulses occurring in said timed relationship with the operation of the engine, recognition means connected to said generator and distinguishing the primary and secondary pulses and injector control means connected to the recognition means and the injectors and initiating operation of the first injector when a primary pulse is recognised and of the second injector when a secondary pulse is recognised by the recognition means.

In the accompanying drawings

Figure 1:
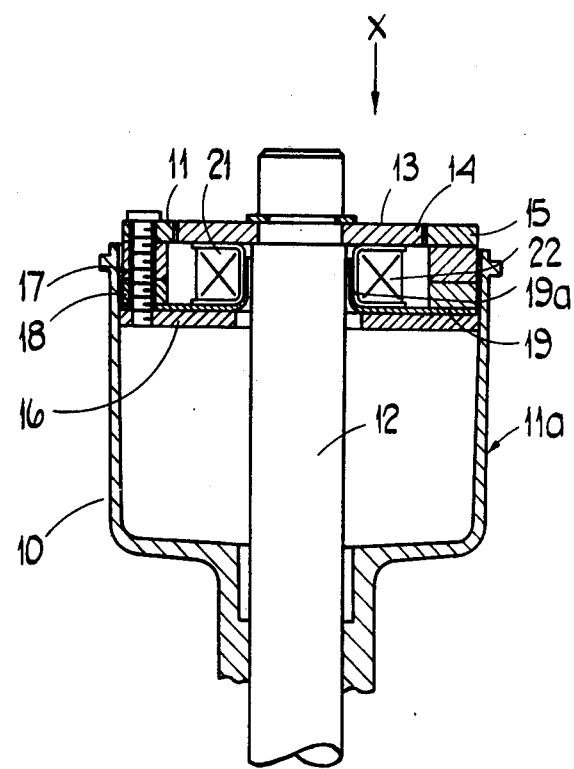
FIG. 1 is a part-sectional view of an example of an angular position signal generator in accordance with the invention.
Figure 2:
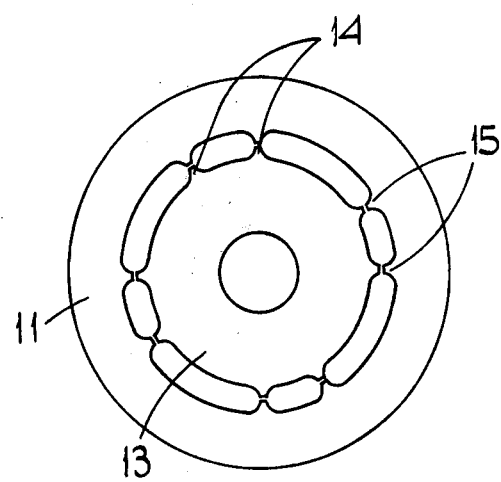
FIG. 2 is an end view of the signal generator in the direction of the arrow 'X' in FIG. 1.

Referring to FIGS. 1 and 2 of the drawings, the generator 9 includes a stator 10 comprising a ferromagnetic annular stator plate 11 housed in a die-cast body 11a and a rotor consisting of a shaft 12 journalled in the die-cast body 11a and carrying at its upper end a plate 13 having a set of salient poles 14 which extend circumferentially in a non-uniform predetermined sequence. The stator plate 11 also has a set of salient poles 15 arranged in the same sequence. The stator plate 11 is mounted on an annular ferromagnetic base plate 16, forming part of the body 11a, by screws passing through the plate 11, an annular ferromagnetic packing member 17, an annular magnet 18, and an annular ferromagnetic winding-support member 19, the annular members being concentric with the axis of the shaft 12 and arranged in the order stated. The winding-support member 19 at its inner diameter has a tubular extension 19a extending to a position adjacent the rotor plate 13, the extension 19a providing a clearance with the shaft 12. Mounted on the winding-support member 19 and extension 19a is a winding former 21 on which is wound the output winding 22. The annular magnet 17 is magnetised in a direction parallel to the shaft axis such that the stator poles are all N poles and the rotor poles all S poles. It will be seen from FIG. 2 that in four angular positions of the rotor all the poles on the rotor will be aligned with all the poles on the stator so that the flow of flux will be at a maximum. In all other positions where poles are aligned, only a proportion of the poles will be in alignment, hence the coupling will be substantially less than in the four angular positions, and so with the rotor rotating at constant speed the output voltage from the winding 18 will have four peaks substantially in ecess of the output from the winding 18 at any other time.

Figure 3:
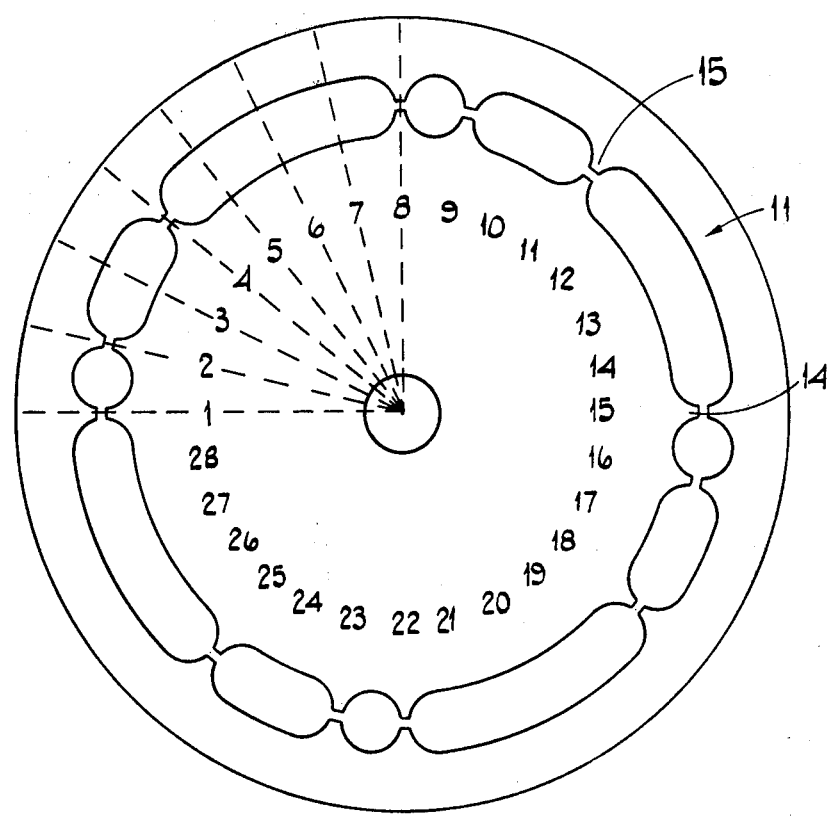
FIG. 3 is a view like FIG. 2 showing an alternative form of generator.

In order to explain the positioning of the poles, reference is directed to FIG. 3 which shows an alternative pole arrangement to that of FIG. 2 but will serve to demonstrate the principle of the detector. For the sake of explanation, the stator 11 is imagined to be divided into 28 parts, so that there are 28 positions in which poles can be either present or absent. These 28 positions can be considered as four sets of seven positions, because within each 90° sector, the pole positions are to be the same. Because of this, in analysing the pole positions only one 90° sector need be considered. It will be seen from the drawing that in a 90° sector which is imagined to have seven possible pole positions, it has been decided to have identical poles at the first, second and fourth positions. The choice of three poles in seven possible positions is arbitrary, but illustrates the principle.

Consider now the situation as the rotor moves. The effect can be seen from the following table.

|        |   |   |   |   |   |   |   |   | Linkage |
|--------|---|---|---|---|---|---|---|---|---------|
| Stator |   | A | B | c | D | e | f | g | —       |
| Rotor  | 1 | A | B | c | D | e | f | g | 3       |
|        | 2 | g | A | B | c | D | e | f | 1       |
|        | 3 | f | g | A | B | c | D | e | 1       |
| 4 | e | f | g | A | B | c | D | 1 |
| 5 | D | e | f | g | A | B | c | 1 |
| 6 | c | D | e | f | g | A | B | 1 |
| 7 | B | c | D | e | f | g | A | 1 |

The first line of the table represents the stator position, with the seven pole positions indicated by letters, and the capital letters denoting the places where poles are actually present. The next line illustrates the position of the rotor shown in the drawing. The next six lines show what happens to the poles on the rotor as the rotor moves through its seven possible positions. It will be appreciated that as the rotor moves from the position shown in FIG. 3 to the next position, the rotor pole position g does not in fact become aligned with the pole position A on the stator, but of course an equivalent rotor pole position g in another 90° sector does become aligned in this way, and so the analysis is accurate.

The table shows the degree of flux linkage between the rotor and stator at constant speed. In the first position of the rotor, there are three poles on the rotor aligned with three poles on the stator, and so the flux linkage can be regarded as at a value 3. In all other positions the maximum flux linkage is one. Thus, as the rotor passes through the first position a pulse is produced which has three times the magnitude of any of the other pulses produced. Clearly, the high-level pulse can readily be identified and utilised to indicate the position of the rotor. Similar tables can readily be produced for other possible pole positions. For example with poles at the first, third and fifth positions it will be found that the linkage is of the form 3021120. With poles at positions 1, 2 and 7 the linkage is 3210012. With poles at the first, fourth and fifth positions the linkage is 3102201. With poles at the first, second and fifth positions the linkage is also 3102201. These last four examples are not as useful as the first example for some applications because the maximum value pulse is not so much greater in magnitude than some of the other pulses. Nevertheless, the arrangements can be used with satisfactory detectors, and fall within the scope of the invention.

While in the example given a 90° sector is imagined to have seven pole positions, it will be appreciated that in order to obtain a high-level pulse at the 0° and 90° positions of the rotor, together with lower-level pulses at intermediate positions the number of possible pole positions could be as low as three as shown in FIG. 2, in which case two of the three positions would be occupied i.e. positions one and two, or one and three (FIG. 2), or two and three. The output from such a system using the method of expressing flux linkages in the previous example would be 211.

It will also be understood that the number of pole positions could be an even number. If for example there were six pole positions, three of which were occupied in positions one, two and five the linkages will be 311211, which for some applications may be more useful, since it enables two clear positions of the rotor to be distinguished. However, if the three positions were one, three and five it will be seen that this arrangement will provide a rotor and stator having uniformly distributed poles such that the linkages will be 303030, in which case there is no distinction between the rotor being in the first, third and fifth positions.

While the detectors in the examples have provided 90° positions of maximum flux linkages together with reduced flux linkages at intermediate positions it will be appreciated this is merely by way of example and the pole pattern can be arranged such that any required number of positions of maximum flux linkages with intermediate positions of reduced flux linkages down to one position of maximum flux linkage for every 360° of rotor movement.

While it would be possible to arrange successive stator poles or rotor poles to alternate in polarity it is preferred to arrange that they be of the same polarity, but obviously opposite in sense one set with respect to the other.

It has already been explained that the choice of seven possible pole positions and three possible poles is a random choice. A designer can readily consider other possibilities, with more or less pole positions, and more or less poles, and then using the techniques explained above work out simply just what the sequence of output pulses will be. If there are to be an extremely large number of pole positions, then the possibilities become large, and so a designer may make use of a computer to decide on the best pole positions for a given requirement.

Figure 5:
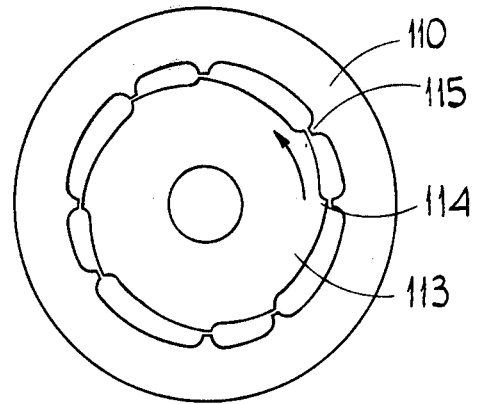
FIG. 5 is another view like FIG. 2 showing a generator having a modified pole shape.

The arrangement shown in FIG. 5 is suitable for use in place of the rotor and stator assembly shown in FIG. 2 of the drawings. Thus, referring to FIG. 5, the rotor 113 has poles which are of sawtooth shape so that as the rotor 113 moves in the direction indicated by the arrow, and the poles 114 pass the poles 115 on the stator 110, the flux increases more rapidly than it decreases.

Figure 4:
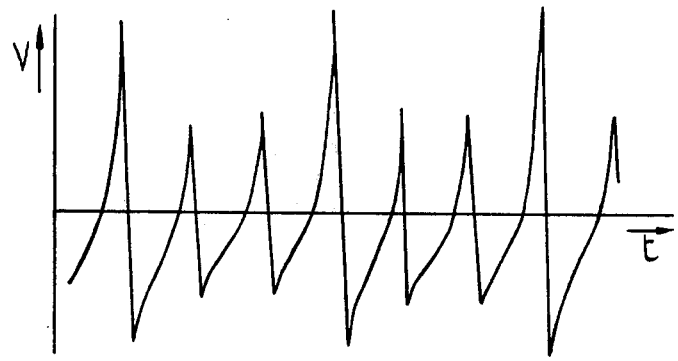
FIG. 4 is a graph showing the output wave form produced in use by the generator shown in FIGS. 1 and 2.
Figure 6:
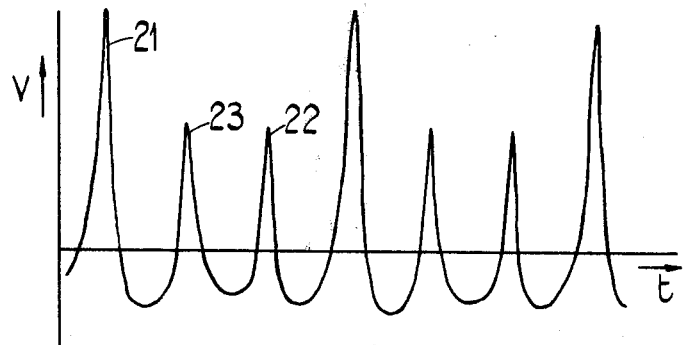
FIG. 6 is a graph like FIG. 4 showing the output wave form produced by the generator of FIG. 5.

The arrangement is such that the pulses produced by the winding are positive going as the flow of flux is increasing and negative going when flux is decreasing. Moreover, it will be seen from the waveform shown in FIGS. 4 and 6 that with the arrangement of FIG. 5 the rate of change of voltage in the output winding as a negative pulse terminates and the next positive pulse commences is greater than that obtained using the arrangement of FIG. 2. Thus the arrangement of FIG. 5 results in the start of the positive pulses being more clearly defined so enabling more accurate integration of the positive pulses.

It is to be appreciated that, by suitable arrangement of the output winding the detector of FIG. 1 can also be arranged to produce an output in which positive pulses result from decreasing flux and negative pulses result from increasing flux. In this case, of course, it would be the negative pulses which would have improve definition.

Figure 7:
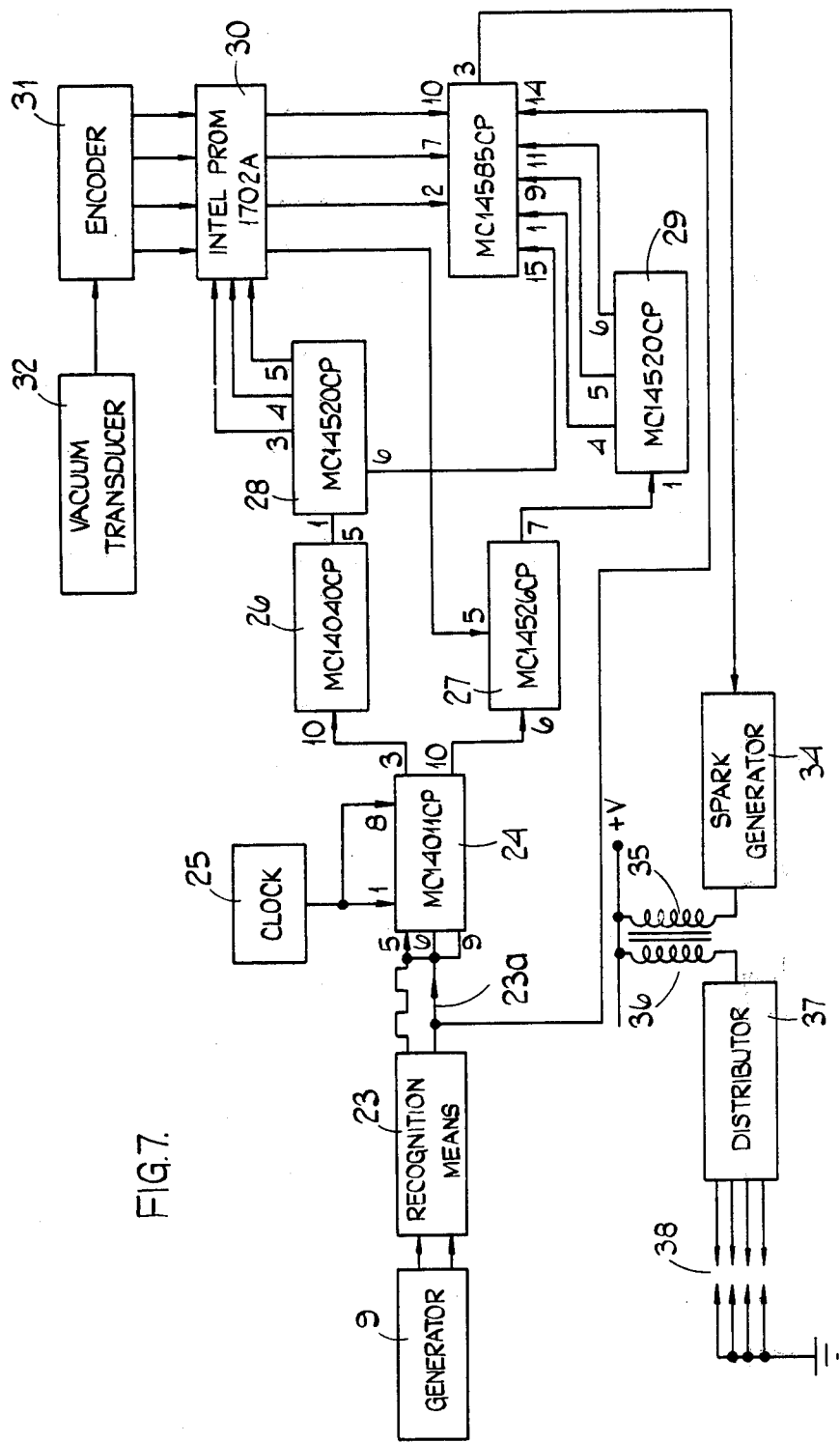
FIG. 7 is a block diagram of an example of an internal combustion engine spark ignition system in accordance with the invention.

The ignition system shown in FIG. 7 includes a generator 9 which may utilize the pole form of either FIG. 2 or FIG. 5. The winding of the generator 9 is connected to a pulse height recognition means 23 which as explained hereinafter provides an output for controlling the ignition control system. The output is connected to an electronic two-way switch 24 constituted by a Motorola CMOS integrated circuit type MC 14011 CP. This output is connected to pins 5, 6 and 9 of the integrated circuit and pins 1 and 8 are connected to a fixed frequency clock pulse generator 25. The circuit 24 has two output terminals at pins 3 and 10 and these are connected to two frequency dividers 26, 27. The divider 26 is a Motorola CMOS integrated circuit type MC 14040 CP, the input being to pin 10 and the output from pin 5. The other frequency divider is programmable and is a Motorola CMOS integrated circuit type MC 14526 CP with its input at pin 6 and its output at pin 7. Two different rates of division are possible depending on the input to pin 5. The outputs of the two frequency dividers are supplied to two counters 28, 29 which are both Motorola CMOS integrated circuits type MC 14520 CP. In both cases the input is applied to pin 1, and in the case of counter 28 a three bit output is taken from pins 3, 4 and 5 whilst the output of counter 29 is taken from terminals 4, 5 and 6.

The 3-bit output of the counter 28 is applied to a PROM memory matrix device 30 which is an INTEL MOS integrated circuit type 1702A programmed according to the engine to be controlled in accordance with an empirically determined programme. The device 30 also receives a digital input from an encoder 31 which is connected to a manifold vacuum transducer 32. The purpose of the device 30 is to provide a digital output representing the required delay between a datum and the instant for producing a spark and the programme. within the device varies this output in accordance with variations in the two digital inputs.

The output of the device 30 is applied to a digital comparator 33 which is a Motorola CMOS integrated circuit type MC 14585 CP. The inputs from the device 30 are connected to pins 2, 7 and 10 and the output of counter 29 is connected to pins 1, 9 and 11. In addition the output of the recognition means 23 is connected to the pin 14 and pin 6 of counter 28 is connected to pin 15.

The output of the comparator 33 (pin 3) is connected to a spark generator circuit 34 (of which there are very many suitable types available) and which draws current through the ignition coil primary winding 35. The secondary winding 36 is connected via a distributor 37 to the spark plugs 38.

In use, while an output from the output terminal 23a of the recognition means 23 is high, the switch 24 channels pulses from the clock 25 through the divider 26 to the counter 28. Such counting ceases when the output at terminal 23a goes low. Terminals 2, 7 and 10 of the comparator 33 now receive an input corresponding to the required delay. Meanwhile the counter 29 is clocked via the frequency divider 27 and the switch 24. When the count in counter 29 reaches the count from the device 30 the output at pin 3 of comparator 33 goes high and a spark is caused. The connection between pin 5 of the divider 27 and the device 30 enables the necessary accuracy of performance to be maintained over the full speed range. The connection between pin 6 of the counter 28 and pin 15 of the comparator 33 together with the connection between terminal 23a of the recognition means 23 and pin 14 of the comparator 33 ensure that the delay is a maximum for all engine speeds below a predetermined value.

Figure 8:
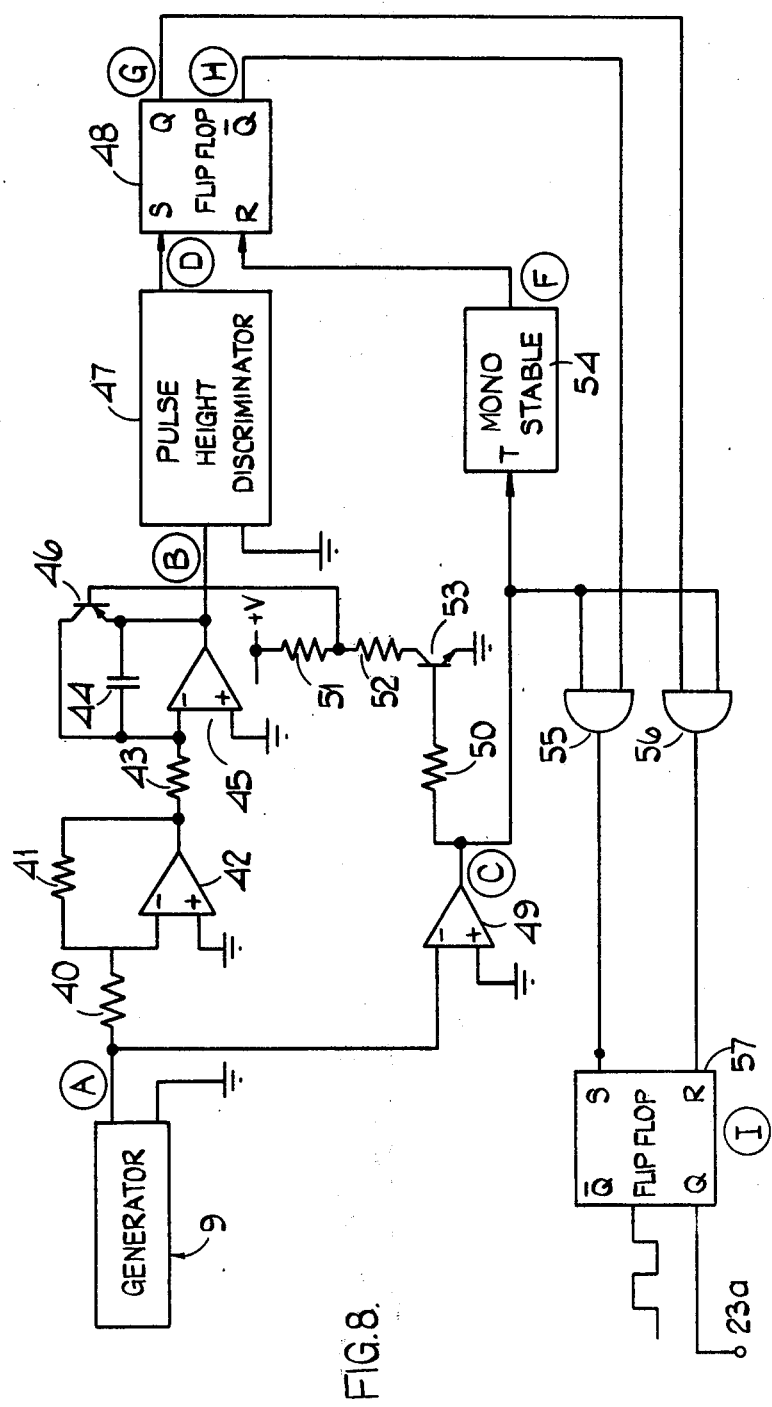
FIG. 8 is a more detailed circuit diagram of a recognition means forming part of the system of FIG. 9.

Referring to FIG. 8, the recognition means includes a buffer amplifier 42 which receives the pulses from the generator 9 by way of a resistor 40. The buffer amplifier 42 has a resistor 41 in its feedback path and its output is fed through a resistor 43 to an integrator in the form of an amplifier 45 with a feedback capacitor 44. The output from the integrator is fed to a pulse height discriminator 47 and the output from the discriminator 47 is fed to the S-terminal of a flip-flop circuit 48, the Q and $\overline{Q}$ outputs from which are fed to AND gates 55 and 56 which in turn provide inputs to a flip-flop 57, the output from which is fed to the terminal 23a. The generator 9 also provides an input to a zero-crossing detector 49, which provides an output to the AND gates 55 and 56 and to a monostable circuit 54, the output from which provides the other input to the flip-flop 48. The zero-crossing detector 49 also re-sets the integrator, and for this purpose has its output terminal connected through a resistor 50 to the base of a transistor 53 with a pair of series resistors 51, 52 in its collector circuit, the junction of the resistors 51, 52 being connected to the base of a transistor 46 connected across the capacitor 44, so that conduction of the transistor 46 (as a result of conduction of the transistor 53) discharges the capacitor 44 to re-set the integrator.

Figure 9:
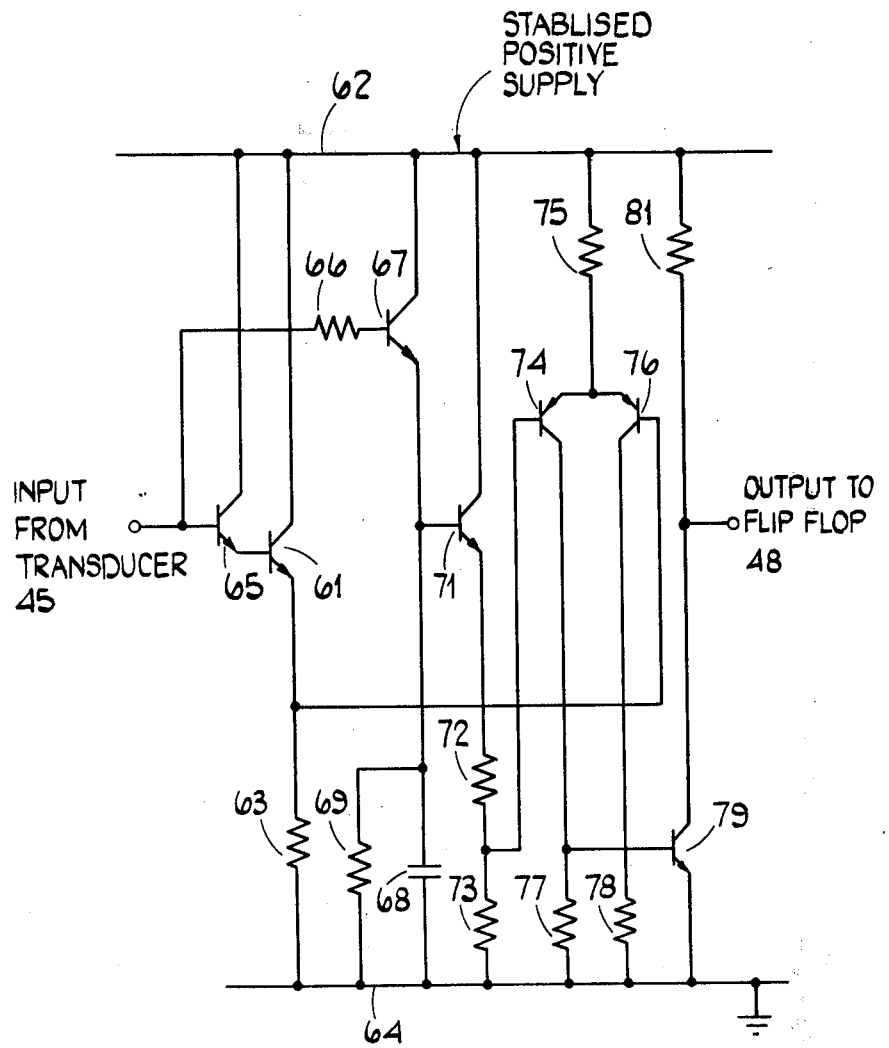
FIG. 9 is a circuit diagram of a pulse height discriminator forming part of the circuit of FIG. 8.

Referring to FIG. 9, the pulse height discriminator 47 includes an n-p-n transistor 61 having its collector connected to a positive supply line 62 and its emitter connected by way of a resistor 63 to a negative supply line 64 which is earthed. In use, the supply lines 62, 64 receive a stabilised d.c. supply from the battery of the vehicle employing the system. The base of the transistor 61 is connected to the emitter of an n-p-n transistor 65, the collector of which is connected to the supply line 62 and the base of which is connected to the amplifier 45. The output from the amplifier 45 is also fed by way of a resistor 66 to the base of an n-p-n transistor 67, the collector of which is connected to the supply line 62 and the emitter of which is connected to the supply line 64 by way of a capacitor 68 bridged by a resistor 69. The emitter of the transistor 67 is further connected to the base of an n-p-n transistor 71 having its collector connected to the supply line 62 and its emitter connected by way of a pair of series resistors 72, 73 to the supply line 64. The junction of the resistors 72, 73 is connected to the base of a p-n-p transistor 74 having its emitter connected to one end of a resistor 75, the other end of which is connected to the supply line 62. Said one end of the resistor 75 is further connected to the emitter of a p-n-p transistor 76 which has its base connected to the emitter of the transistor 61 and defines a comparator with the transistor 74. The collectors of the transistors 74, 76 are connected by way of respective resistors 77, 78 to the supply line 64, the collector of the transistor 74 further being connected to the base of an n-p-n transistor 79. The emitter of the transistor 79 is connected to the supply line 64 and its collector is connected to the flip-flop 57 and by way of a resistor 81 to the supply line 62.

Figure 10:
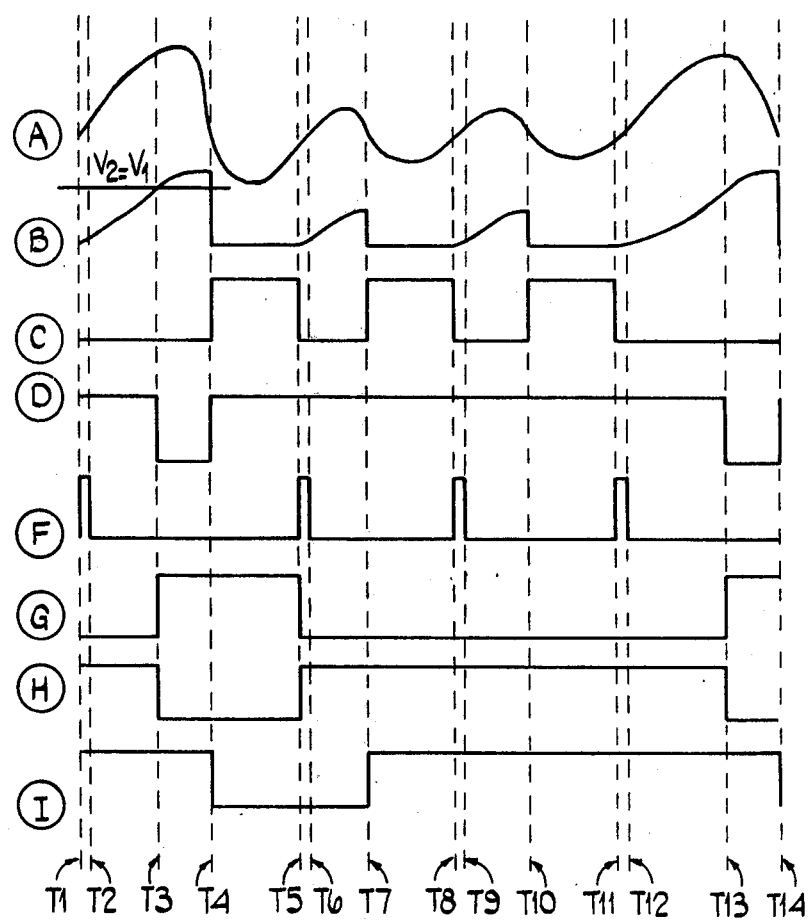
FIG. 10 is a composite graph showing wave forms at various positions in FIG. 8.

In use, the discriminator 47 receives positive pulses from the integrator 45 of the form shown in FIG. 10 and each time a positive pulse is received the transistor 67 is turned on and the capacitor 68 charges. Between positive pulses, the capacitor can discharge slowly and hence it will be seen that at any given moment the capacitor 68 is charged to a value representing the maximum voltage appearing at the base of the transistor 67. Of course, each time the generator 27 produces a pulse 21, the output from the integrator 45, and hence the voltage at the base of the transistor 67, is at a maximum. Thus, at any given moment the capacitor 68 is charged to a value representing the output from the integrator 45 generated by the previous pulse 21. The transistor 67 and capacitor 68 thereby define a peak detector circuit which is arranged so that its output is always dependent upon the integral with respect to time of the previous pulse 21 irrespective of any variation in the magnitude of said integral with engine speed. Of course, if the peak detector circuit is to operate in this manner, the rate of discharge of the capacitor 68 must be sufficient to cater for the expected rate of decrease in magnitude of the maximum pulses from the integrator 45.

The transistor 71 is permanently biased to conduction by the output from the peak detector circuit and hence a voltage $V_1$ appears at the base of the transistor 74, the voltage $V_1$ being a fraction of the output from the peak detector circuit determined by the values of the resistors 72, 73 and the volt drop across the base-emitter of the transistor 71. Each time the integrator 45 produces an output corresponding to one of the pulses 21, 22 or 23 the transistors 65, 61 are also switched on so that a voltage $V_2$ appears at the base of the transistor 76. The magnitude of the voltage $V_2$ will of course depend upon whether the output from the integrator 45 is at a maximum, corresponding to a pulse 21, or at an intermediate value, corresponding to one of the pulses 22 or 23. If one of the pulses 21 is being generated, the voltage $V_2$ will at some stage exceed the voltage $V_1$. When this occurs, the voltage across the resistor 77 rises above earth potential, it being appreciated that the resistor 77 is normally at earth potential since the transistor 74 is biased against conduction. When the voltage across the resistor 77 rises, the collector voltage of the transistor 79 falls so that a negative pulse is produced in the output to the flip-flop 48. The arrangement is such that whenever a pulse 22 or 23 is produced, the voltage $V_2$ does not exceed the voltage $V_1$ so that the resistor 77 remains at earth potential and the output to the flip-flop 48 is unchanged. Hence the discriminator circuit 47 produces a negative output pulse only when a signal 21 appears at the integrator 45.

The way in which the output from the discriminator 47 is used to control ignition is best understood with reference to FIG. 10, which illustrates one cycle of operation. In FIG. 10, ten important periods during one cycle are shown and are indicated by the references T1 to T10 respectively. The upper waveform is the input from the generator 9.

At time T1, one of the pulses 21 commences, and the zero crossing detector 49 switches and triggers the monostable circuit 54. The monostable circuit 54 does not change the state of the flip-flop 48 at this stage.

At time T2 the monostable circuit re-sets, but nothing else happens.

At time T3, the voltage $V_2$ begins to exceed the voltage $V_1$ and the discriminator 47 produces a negative output pulse which sets the flip-flop 48.

At time T4, the pulse 21 crosses the zero point and the detector 49 switches, re-setting the integrator and terminating the negative output pulse from the discriminator 47. Also, the logic input to the AND gates 55 and 56 is changed, so that the gate 56 has two high inputs, one from the detector 49 and one from the flip-flop 48. The AND gate 56 thereby changes the state of the flip-flop 57.

At time T5, the pulse 23 commences, the detector 49 switches and triggers the monostable 54, which re-sets the flip-flop 48.

At time T6, the monostable 54 again finishes its output pulse.

At time T7, the pulse 23 crosses the zero point, the detector 49 switches and re-sets the integrator, so that this time the AND gate 55 has two inputs high and sets the flip-flop 57 to recommence build up of energy in the winding 23. It will be noted that the pulse 23 does not cause the voltate $V_2$ to reach a level such that the output from the discriminator 47 is affected.

At time T8, one of the pulses 22 starts, the detector 49 switches and triggers the monostable circuit 54, which has no effect.

At time T9, the monostable circuit re-sets.

At time T10, the pulse 22 crosses zero, the detector 49 switches and re-sets the integrator, and now the AND gate 55 has two inputs high and provides an output to the flip-flop 57. However, the flip-flop 57 has already received an output from the gate 55 and does not change state.

A pulse 21 now appears again, and the cycle is repeated.

Figure 11:
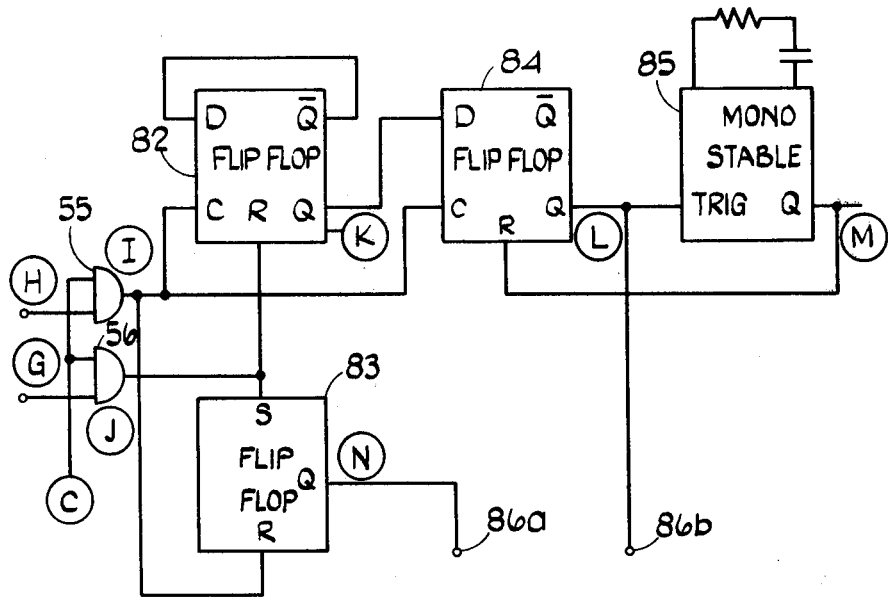
FIG. 11 shows a possible modification in the circuit shown in FIG. 8.
Figure 12:
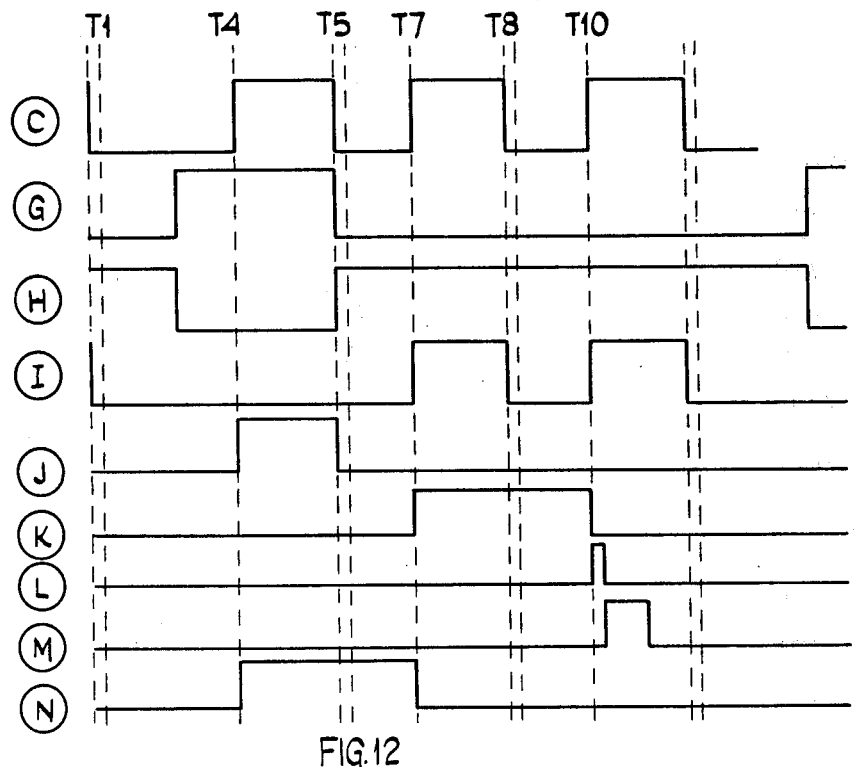
FIG. 12 shows the wave forms at various positions in FIG. 11.
Figure 13:
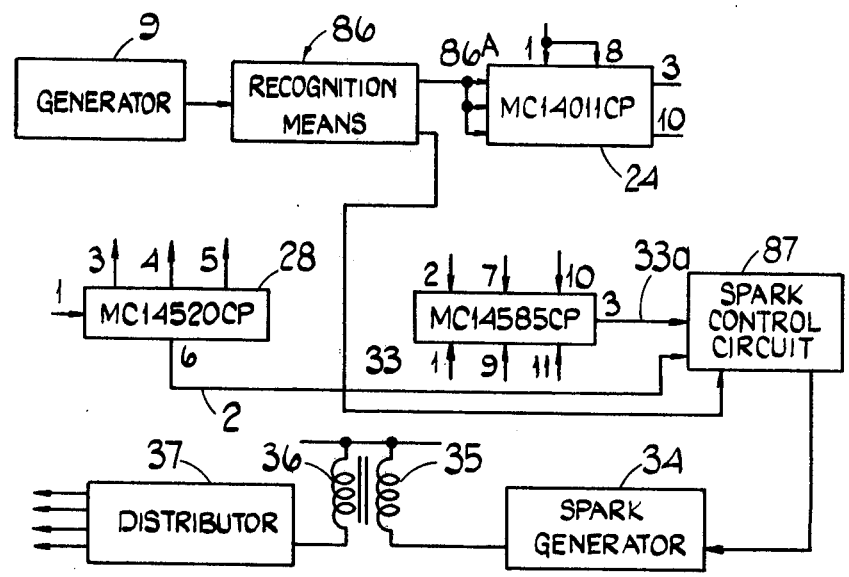
FIG. 13 shows an additional modification which can be made to the system shown in FIG. 7 when the modification of FIG. 11 is included.

Referring now to FIGS. 11, 12 and 13 the flip-flop 57 is omitted and is replaced by three flip-flops 82, 83 and 84 and a monostable circuit 85. The output of the gate 55 is connected to the C input terminals of flip-flops 82 and 84 and to the reset input of the flip-flop 83. The output of the gate 56 is connected to set input of flip-flop 83 and the reset input of the flip-flop 82. The $\overline{Q}$ output terminal of the flip-flop 82 is connected to its D input terminal and its Q output terminal is connected to the D input terminal of the flip-flop 84. The Q output terminal of the flip-flop 84 is connected to the trigger terminal of the monostable circuit 85 the Q output terminal of which is connected to the reset terminal of the flip-flop 84. The terminals 86a and 86b are connected respectively to the Q outputs of the flip-flops 83 and 84.

Referring to FIG. 12 the modification operates as follows.

T1  gate 55 goes LO.
T4  gate 56 goes HI. This applies a reset pulse to flip-flop 82 (just in case this flip-flop was not already reset) and sets flip-flop 83, making the Q go HI.
T5  gate 56 goes LO.
T7  gate 55 goes HI. This resets flip-flop 83 (whose Q goes LO) and clocks flip-flop 82, whose Q goes HI. (N.B. with $\overline{Q}$ connected to D, flip-flop 82 is a "toggle" flip-flop, i.e. it changes state on every clock pulse).
T8  gate 55 goes LO.
T10 gate 55 goes HI again. This makes flip-flop 82 toggle (Q goes LO) and also makes flip-flop 84 Q to HI. This triggers the monostable 85, whose Q goes HI for a period determined by a resistor/capacitor network. Because the monostable 85 Q is connected to the reset pin of flip-flop 84, as soon as 85 Q goes HI, 84 Q returns LO. Hence the pulse observed at the Q of flip-flop 84 is of very short duration (duration determined by propagation delays in 84 and 85).

FIG. 13 shows how the circuit of FIG. 7 is modified to incorporate the modification of FIG. 11. The recognition means 86 comprises the recognition means 23 together with the modification shown in FIG. 11.

The output 33a from pin 3 of the comparator 33 is no longer connected to the spark generator 34, but instead is connected to a spark control circuit 87. The output 28a from pin 6 of the counter 28 is no longer connected to the comparator 33, but instead is connected to the spark control circuit 87. The output 86a from the recognition means 86, which is the Q output of the flip-flop 83, is connected to the two-way electronic switch 24 and peforms the same function as did the output 23a of the recognition means 23 in FIG. 7, in that it causes the switch 24 to route clock pulses from the clock 25 first to the divider 26 and then the divider 27 as before. However the output 86a is not connected to the comparator 33 as was output 23a (FIG. 7). Instead output 86b is connected to the spark control circuit 87. The output of spark control circuit 87 is connected to the spark generator 34.

In use, the output 28a is low except when the engine speed falls below a predetermined level. So long as the output 28a is low, the circuit of FIG. 13 functions in the same way as that of FIG. 7. When output 33a goes high, indicating that the count in the counter 29 is equal to the output of the device 30, the spark control circuit causes the spark generator 34 to interrupt the flow of current in the primary winding 35 of the ignition coil, thereby producing a spark.

If output 28a goes high indicating that the engine speed has fallen below the predetermined value the function of the spark control circuit 87 is to ignore any signal it may receive from the comparator 33, and instead await a signal pulse from the output 86b. When the pulse appears at 86b the spark control circuit 87 causes the spark generator 34 to produce a spark in the manner previously described.

For use in the circuit of FIG. 13, the rotor and stator of the generator 9 are aligned so as to cause the recognition means 86 to produce a pulse at output 86b when any cylinder of the engine is in the static timing position. In the particular example of a 4-cylinder i.c. engine the output 86a gives provision for the ignition spark to be generated up to 60° (engine) before and after the static timing position. The circuit of FIG. 7 only gives provision for the ignition spark to be generated up to 60° (engine) before the static timing position. The added range provided by the arrangement of FIG. 13 can be used during overrun conditions to reduce toxic exhaust emission.

Figure 15:
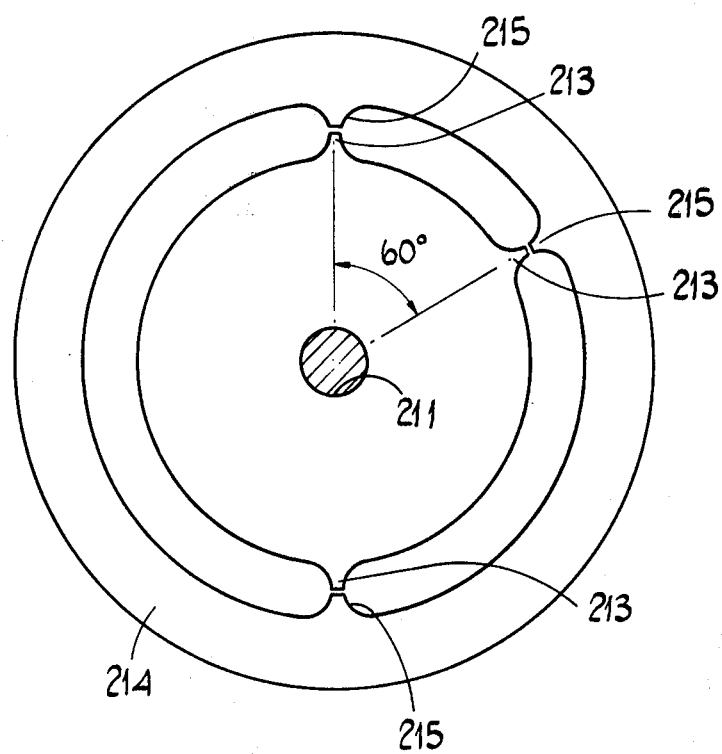
FIG. 15 is a view like FIG. 2 of a generator used in the system of FIG. 14.

Referring now to FIG. 15 the generator has a shaft 211 which is driven by the engine of the vehicle and on which is secured a generally circular rotor 212. At its circumference, the rotor 212 is formed with three radially outwardly extending poles 213 which are arranged non-uniformly so that a pair of the poles 213 are diametrically opposite and the remaining pole 213 is separated by an angle of 60° from one of said pair of poles and an angle of 120° from the other. Surrounding the rotor 212 is an annular stator 214 which, at its internal periphery, is provided with three poles 215 arranged in exactly the same way as the poles 213 on the rotor 212. Moreover, an output coil (not shown) is mounted around the shaft 211 and adjacent the rotor 212 and stator 214.

In use, as the shaft 211 rotates, the flux linkage between the poles 213, 215 varies and so a variable voltage is induced in the output coil. With the rotor in the position shown in FIG. 15, the flux linkage is at a maximum, because all the poles 213 on the rotor 212 are aligned with all the poles 215 on the stator 214. Thus, when the rotor 212 is in the position shown in FIG. 15, the coil produces a large primary output pulse. However, as the rotor 212 moves 60° in a clockwise direction from the position shown in FIG. 15, a position is reached at which the flux linkage is reduced to a third of said maximum value since now only one of the poles 213 is aligned with a pole on the stator 214. In this position of the rotor the coil produces a small tertians output pulse, a further such tertians pulse produced when the rotor is moved through a further 60° in said clockwise direction. After another 60° movement in the same direction it will be seen that a position is reached where two of the poles 213 are aligned with poles on the stator 214 and in this position there is produced a secondary pulse of magnitude intermediate those of the primary and secondary pulses. This process is repeated as rotation of the rotor 212 continues so that it will be seen for each engine cycle there is produced one primary pulse, one secondary pulse, and four tertians pulses 217.

Figure 14:
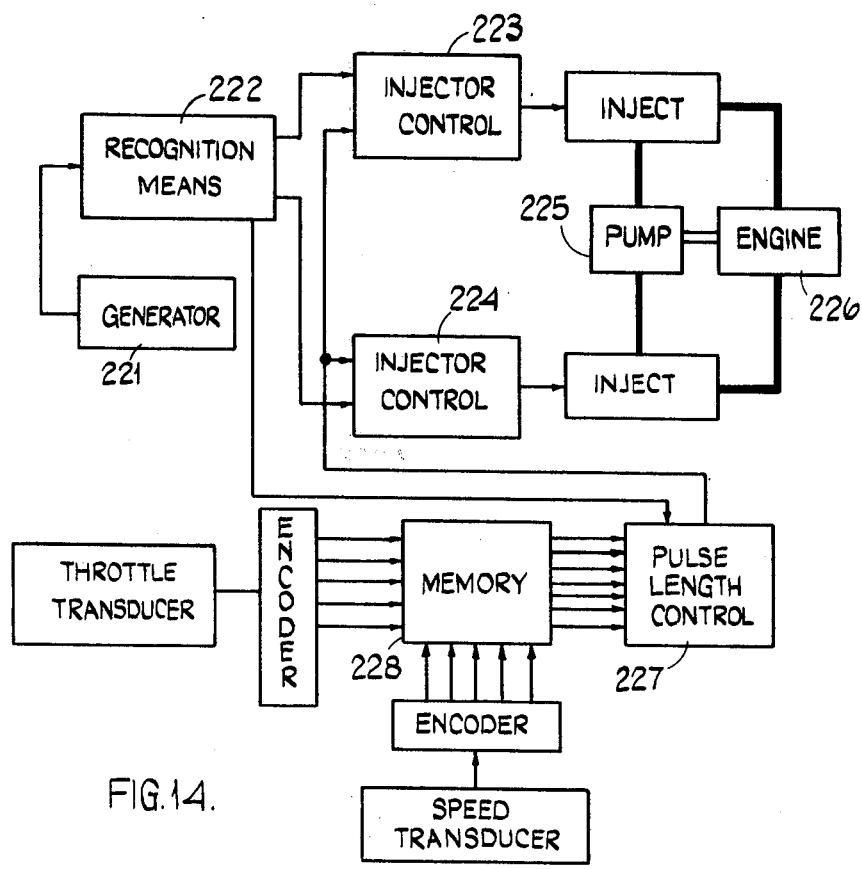
FIG. 14 is a block diagram of an example of a fuel injection control system in accordance with the invention.

The way in which the pulses are used is shown diagramatically in FIG. 14, in which the generator defined by the rotor 212, stator 214 and the output coil is shown at 221. Thus, as the shaft 211 is rotated by the engine the generator 221 produces the pulses which are fed to recognition means 222 which in turn controls operation of first and second fuel injection controls 223, 224 respectively. As is described in detail below, the recognition means 222 distinguishes the large, primary pulses from the intermediate, secondary pulses and ignores the small tertians pulses. Moreover, the recognition means 222 is arranged so as to supply the large pulses to the first injector control 223 and the secondary pulses to the second of injector control 224. Thus, when a primary pulse is received, the or each injector of the set controlled by the first injector control 223 is operated, whereas when a secondary pulse is received the or each injector of the set controlled by the second injector control 224 is operated, it being appreciated that each set may consist of one or more fuel injectors. The injectors receive fuel from a supply 225 so that, when operated, they supply fuel to the engine 226, the length of time for which the injectors remain operative being determined by variable timing means 227. The recognition means 222 also provides an input to the timing means 227 so that the latter commences timing whenever a primary or secondary pulse is received to initiate operation of the injector controls 223 or 224 respectively. The timing means 227 then allows the injectors to operate for a given time period which is variable in accordance with a demand signal from a digital memory 228, the latter being arranged so that the deman signal is determined by at least two operating parameters of the engine 226 and hence on the fuel requirements of the engine, e.g. throttle angle and engine speed.

As will become apparent from the ensuing description, the recognition means 222 is arranged to be responsive to the integral with respect to time of the voltage of the primary and secondary pulses. This arrangement is preferred because it caters for the fact that the magnitude of the pulses vary with engine speed, although of course the relative sizes of the pulses always stay the same. Also, it will be appreciated that although the generator 221 described above produces unwanted tertiary pulses if desired a different form of generator could be employed to avoid the unwanted pulses.

Figure 16:
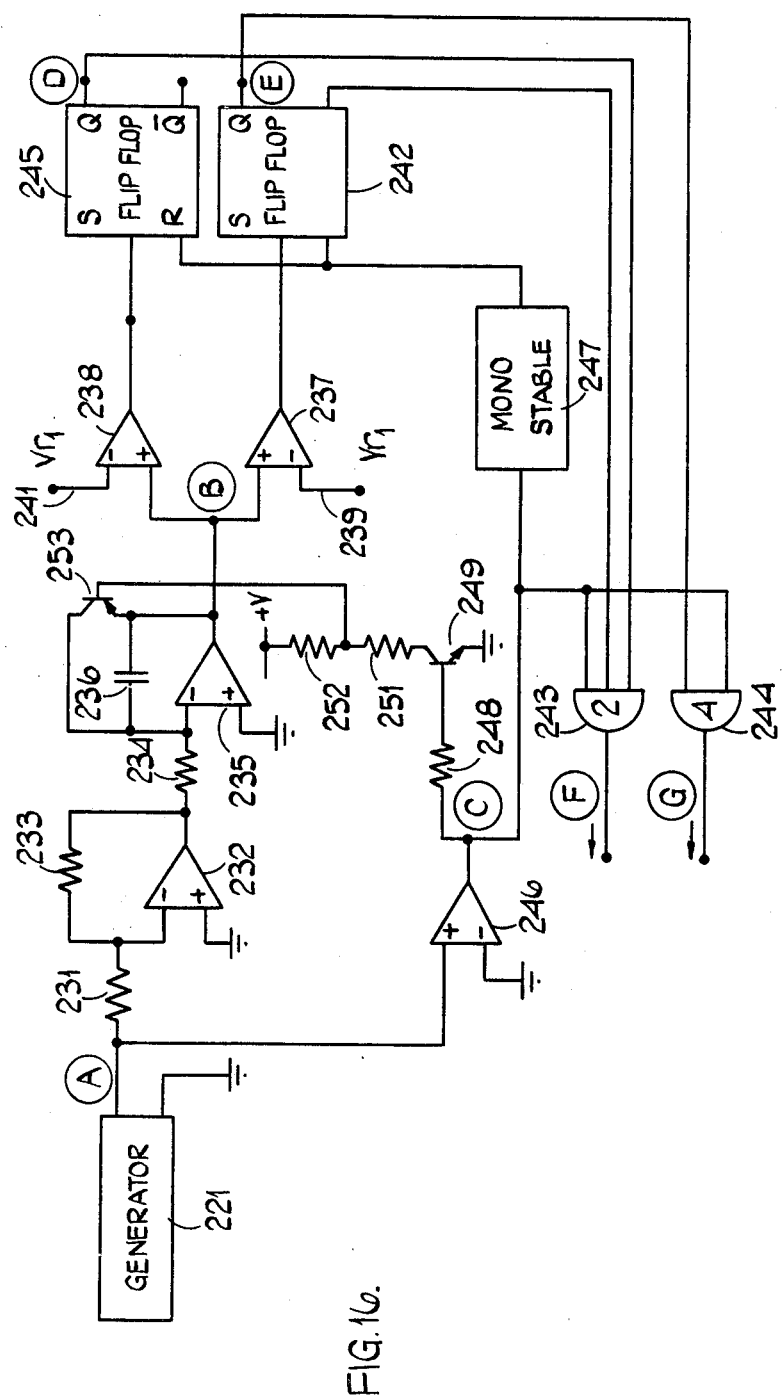
FIG. 16 is a circuit diagram of a recognition means forming part of the system shown in FIG. 14

Referring now to FIG. 16, which shows the system in more detail, the generator 221 provides an input by way of a resistor 231 to a buffer amplifier 232. A resistor 233 is in the feed back part of the amplifier 232 and the output from the amplifier 232 is fed through a resistor 234 to an integrator in the form of an amplifier 235 with a feed back capacitor 236. The output from the integrator is fed to first and second comparators 237, 238 respectively, the comparator 237 also receiving a first reference voltage input 239 and the comparator 238 also receiving a second reference voltage input 241 lower than the input 239. The output from the comparator 237 is fed to a flip-flop circuit 242, the two outputs from which are fed to AND gates 243 and 244 whereas the output from the comparator 238 is fed to a further flip-flop circuit 245 which provides a further input to the gate 243. In use, the output from the gate 244 is used to control operation of the first injector control 223, while the second set of injector controls 224 are controlled by the output from the gate 243. The generator 221 also provides an input to a zero crossing detector 246, which provides inputs to the AND gates 243, 244 and to a monostable circuit 247, the output from which provides the other inputs to the flip-flops 242, 245. The zero crossing detector 246 also re-sets the integrator and, for this purpose, has its output terminal connected through a resistor 248 to the base of a transistor 249 having a pair of resistors 251, 252 in its collector circuits. The junction of the resistors 251, 252 is connected to the base of a trasistor 253 having its collector and emitter connected across the capacitor 236, so that conduction of the transistor 253 as a result of conduction of the transistor 249 discharges the capacitor 236 to re-set the integrator.

Figure 17:
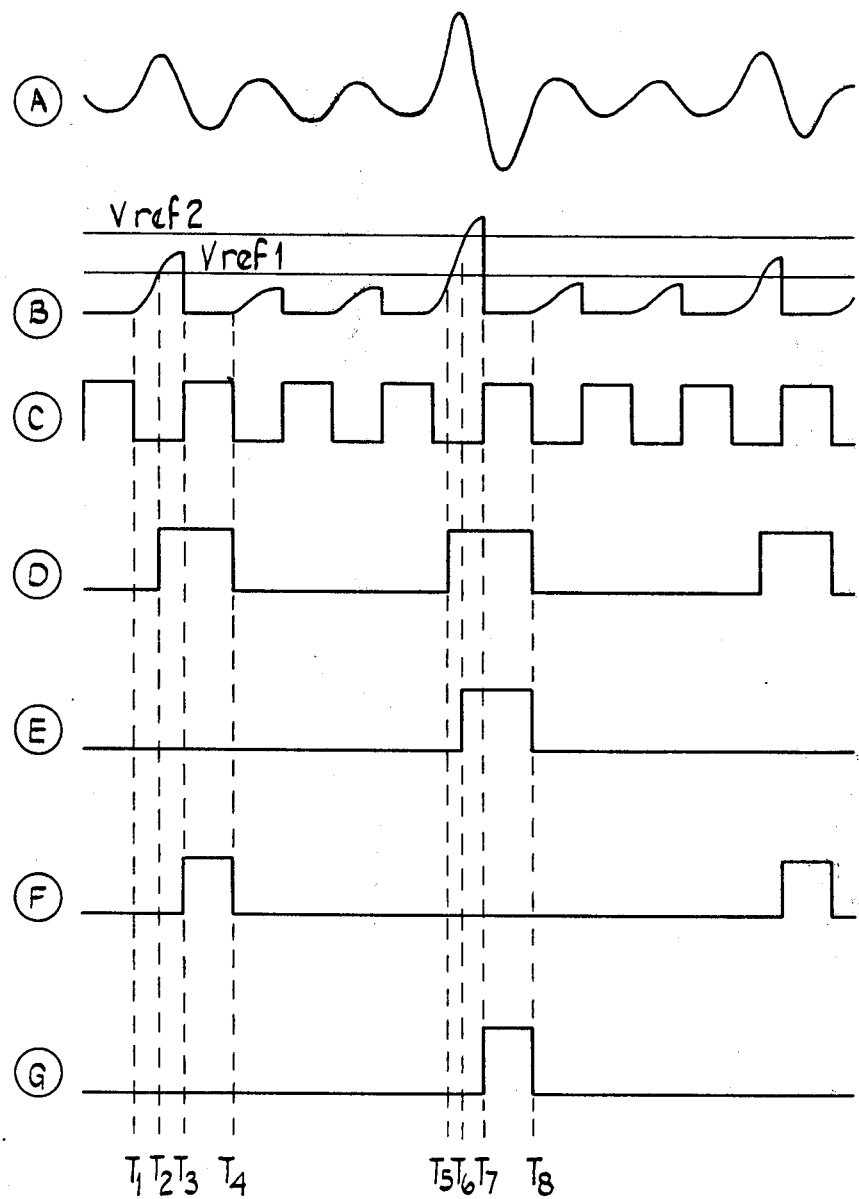
FIG. 17 is a graph showing wave forms at various points in FIG. 16.

The operation of the circuit of FIG. 16 is best explained with reference to FIG. 17, which illustrates the wave forms generated at various points in the circuit at eight important periods during one engine cycle, these periods being indicated by the references T1 to T8 respectively.

At time T1, one of the secondary pulses commences and the zero crossing detector 246 switches and triggers the monostable circuit 247 which, if necessary, re-sets the flip-flops 242, 245.

At time T2, the output from the integrator begins to exceed the lower reference input 241 and the comparator 238 produces an output which sets the flip-flop 245.

At time T3, the secondary pulse crosses the zero point and the detector 246 switches, re-setting the integrator. Switching of the detector 246 also changes the logic input into the AND gates 243 and 244 so that the gate 243 now receives input from the detector 246, the flip-flop 254 and also from the flip-flop 242 since of course the latter is still not set. The gate 243 thereby produces an output pulse so that the injector control 224 is operated to supply fuel to the engine 226.

At time T4, the detector 246 again switches so triggering the monostable 247 and re-setting the flip-flop 245. The output pulse from the AND gate 243 is thereby terminated.

At time T5, the generator 221 is producing a primary pulse and again the output from the integrator begins to exceed the lower reference input 241 so that the comparator 238 produces an output which sets the flip-flop 245. At this stage, however, the logic input provided by the detector 246 to the gates 243, 244 is such that the gate 243 does not produce an output.

At time T6, the output from the integrator begins to exceed the high reference input 239 so that the comparator 237 produces an output so setting the flip-flop 242. The flip-flop 242 thereby provides an input to the gate 244 rather than the gate 243, but at this stage the gate 244 is prevented from producing an output by the detector 246.

At time T7, the primary pulse crosses the zero point so that the detector 246 switches, thereby re-setting the integrator and providing the second input to the gate 244. An output signal is therefore then produced by the gate 244 to initiating operation of the injector control 223.

At time T8, the detector 246 again switches to re-set the integrator and trigger the monostable 247 so as to re-set the flip-flops 242, 245. The output produced by the gate 244 thereby terminates.

When the generator produces the next secondary pulse the above cycle is repeated.

The invention could be applied to a combined fuel and ignition control system using some pulses for ignition control and the same or different pulses for fuel control.

We claim:

1. Apparatus for generating signals at successive angular positions of a rotary member comprising the combination of an electro-magnetic pulse generator drivingly connected to the rotary member and producing a pulse train including primary pulses and secondary pulses of different amplitudes, there being at least one secondary pulse between each pair of successive primary pulses and said pulse train including a plurality of zero-crossings some of which are associated with the primary pulses and coincide with said successive angular positions of the rotary member, recognition means connected to the generator and including an integrating circuit producing an integral signal corresponding to the time integral of at least part of the voltage wave form of each pulse, said recognition means operating to distinguish the primary pulses from the secondary pulses by detecting the magnitude of said integral signal, and control means connected to the recognition means and including a zero-crossing detector circuit connected to the generator for detecting said zero-crossings, said control means producing output signal events coinciding with the zero-crossings associated with the primary pulses.

2. Apparatus as claimed in claim 1 in which said recognition means includes a comparator for detecting when the magnitude of the integral signal exceeds a threshold value.

3. Apparatus as claimed in claim 2 including a peak detector circuit incorporating a capacitor connected to be charged periodically to a voltage representing the peak pulse height of the output of the integrating circuit, said threshold value being a fixed proportion less than unity of the voltage on said capacitor.

4. Apparatus as claimed in claim 2 in which said control means includes a combining circuit connected to the comparator and to the zero-crossing detector and producing an output signal commencing when the comparator detects that said integral signal exceeds said threshold value and terminating when said zero-crossing detector is next switched.

5. Apparatus as claimed in claim 4 in which said combining circuit is a flip-flop circuit set by the output of the comparator and reset by the output of the zero-crossing detector.

6. Apparatus as claimed in claim 1 in which means, triggered by the zero-crossing circuit, are provided for periodically resetting the integrating circuit.

7. Apparatus as claimed in claim 1 in which the electromagnetic pulse generator comprises a rotor, a stator, the rotor having thereon a set of salient magnetic poles all of the same polarity and arranged circumferentially at unequal angular intervals around the rotor and the stator having a set of salient magnetic poles all of the opposite polarity and arranged circumferentially at the same unequal angular intervals, so that in at least one position of the rotor all of the poles on the rotor are aligned with all of the poles on the stator and in at least two other positions of the rotor only some of the poles on the rotor are aligned with poles on the stator, and a winding on the stator for producing said primary pulses as the rotor is turned through said at least one position and said secondary pulses as the rotor is turned through said at least two other positions.

8. Apparatus as claimed in claim 7 in which said stator includes a permanent magnet.

9. In an internal combustion engine spark ignition system including an apparatus for generating signals at successive angular positions of a rotary member comprising the combination of an electro-magnetic pulse generator drivingly connected to the rotary member and producing a pulse train including primary pulses and secondary pulses of different amplitudes, there being at least one secondary pulse between each pair of successive primary pulses and said pulse train including a plurality of zero-crossings some of which are associated with the primary pulses and coincide with said successive angular positions of the rotary member, recognition means connected to the generator and including an integral signal corresponding to the time integral of at least part of the voltage wave form of each pulse, said recognition means operating to distinguish the primary pulses from the secondary pulses by detecting the magnitude of said integral signal, and control means connected to the recognition means and including a zero-crossing detector circuit connected to the generator for detecting said zero-crossings, said control means producing output signal events coinciding with the zero-crossings associated with the primary pulses, wherein the generator is driven by the engine and said system further includes ignition control means, connected to said recognition means and to said zero-crossing circuit, for generating a spark producing signal in the interval between a secondary pulse and the following primary pulse delayed from that secondary pulse by a period determined by a signal generated in said ignition control means in the interval between the preceding primary pulse and a secondary pulse, such intervals beginning and ending under the control of said zero-crossing detector.

10. In an internal combustion engine fuel injection system, including an apparatus for generating signals at successive angular positions of a rotary member comprising the combination of an electro-magnetic pulse generator drivingly connected to the rotary member and producing a pulse train including primary pulses and secondary pulses of different amplitudes, there being at least one secondary pulse between each pair of successive primary pulses and said pulse train including a plurality of zero-crossings some of which are associated with the primary pulses and coincide with said successive angular positions of the rotary member, recognition means connected to the generator and including an integrating circuit producing an integral signal corresponding to the time integral of at least part of the voltage wave form of each pulse, said recognition means operating to distinguish the primary pulses from the secondary pulses by detecting the magnitude of said integral signal, and control means connected to the recognition means and including a zero-crossing detector circuit connected to the generator for detecting said zero-crossings, said control means producing output signal events coinciding with the zero-crossings associated with the primary pulses, said injection system comprising at least first and second injectors, said generator being driven by the engine, and injection control means, connected to the recognition means and the zero-crossing detector, for controlling the injectors such that operation of the first injector is initiated by a primary pulse and operation of the second injector is initiated by a secondary pulse, such pulses occurring in timed relationship with the operation of the engine and coinciding with the zero-crossing associated with said pulses.

11. A system as claimed in claim 10 in which the generator is constructed to produce a single primary pulse during each rotation thereof, a single secondary pulse 180° out of phase with the primary pulse and of lesser magnitude, and a plurality of tertiary pulses of still lesser magnitude between successive primary and secondary pulses, the recognition means including two comparators set to detect the rise of the output of the integrating circuit above appropriate different threshold levels so that only one comparator is triggered by the secondary pulses but both are triggered by the primary pulses.

12. Apparatus as claimed in claim 1 wherein the poles on the stator are of sawtooth shape so that as the rotor is turned the flow of flux between the rotor and stator poles increases more rapidly than it decreases.

13. Apparatus for generating signals at successive angular positions of a rotary member comprising the combination of an electromagnetic generator drivingly connected to the rotary member and producing a pulse train including primary and secondary pulses of different amplitudes, there being at least one secondary pulse between each pair of successive primary pulses and said primary pulses coinciding with said successive angular positions of the rotary member and recognition means for distinguishing the primary pulses from the secondary pulses, said recognition means including an integrating circuit producing an integral signal corresponding to the time integral of at least part of the voltage waveform of each pulse, a peak detector circuit having a capacitor which is charged, periodically to a voltage representing the peak pulse height of the output of the integrating circuit and a comparator circuit connected to the integrating circuit and to the peak detector circuit and producing an output signal when the integral signal exceeds a fixed proportion less than unity of the voltage on said capacitor.

14. Apparatus as claimed in claim 13 in which the peak detector circuit includes a transistor having its base connected to the output of the integrating circuit, its emitter connected by the capacitor to one of a pair of supply rails and its collector connected to the other supply rail.

15. Apparatus as claimed in claim 11 in which there is a resistor connected in parallel with the capacitor.

16. Apparatus as claimed in claim 11 further comprising a further transistor having its base connected to the emitter of said first-mentioned transistor, its collector connected to said other supply rail and its emitter connected by a pair of resistors in series to said one supply rail.

17. Apparatus as claimed in claim 13 in which said comparator circuit has one input connected to the junction of said pair of resistors in series and its other input connected via the base-emitter junctions of two additional transistors to the output of the integrating circuit.

18. Apparatus as claimed in claim 12 in which means are provided for periodically resetting the integrating circuit, such means being triggered by a zero-crossing detector connected to the generator output.

* * * * *